United States Patent [19]
Cuniberti

[11] 3,874,865
[45] Apr. 1, 1975

[54] APPARATUS FOR SELF-CONTROLLING GASEOUS BUBBLER SYSTEM IN A GLASS MELTING FURNACE

[75] Inventor: Mario Cuniberti, Columbus, Ohio

[73] Assignee: Owens-Illinois, Inc., Toledo, Ohio

[22] Filed: Oct. 15, 1973

[21] Appl. No.: 406,497

[52] U.S. Cl. .................................. 65/161, 65/178
[51] Int. Cl. .............................................. C03b 5/18
[58] Field of Search ........................... 65/134–136, 65/178, 179, 161, 301, 32

[56] References Cited
UNITED STATES PATENTS

| | | |
|---|---|---|
| 2,331,052 | 10/1943 | Shadduck ............................ 65/134 |
| 2,890,548 | 6/1959 | Wright ................................. 65/134 |
| 3,239,324 | 3/1966 | Monks ................................. 65/134 |
| 3,294,509 | 12/1966 | Soubier et al ....................... 65/134 |

Primary Examiner—Robert L. Lindsay, Jr.
Attorney, Agent, or Firm—Steve M. McLary; E. J. Holler; Richard B. Dence

[57] ABSTRACT

Apparatus for distributing a gaseous medium to a plurality of bubbler nozzles disposed beneath the glass level in a glass melting furnace or tank in such manner that the gaseous medium itself actuates the system, and in such manner that the gaseous medium is distributed to control a predetermined sequence of operations of each of the various nozzles and to control a predetermined period of operational time thereof, each of the nozzles having a gaseous medium at a lower pressure applied thereto when not bubbling so as to offset the fluid head pressure of the molten glass overlying the nozzle discharge orifice.

5 Claims, 3 Drawing Figures

PATENTED APR 1 1975

APPARATUS FOR SELF-CONTROLLING GASEOUS BUBBLER SYSTEM IN A GLASS MELTING FURNACE

BACKGROUND OF THE INVENTION

1. Field of the Invention

This disclosure relates generally to submerged bubblers for glass melting furnaces or tanks, and more specifically to submerged bubblers and bubbling systems of the type which distribute a gas to various nozzles in the system in a particular sequence for set periods of time through activation of the bubbler system by the pressurized gas which is expelled through the bubbler nozzles.

2. Description of the Prior Art

The use of submerged bubblers in glass melting furnaces or tanks has traditionally been intended to increase the refining rate and maximize glass production for a given size glass melting furnace. The bubbles of gas rise from the submerged bubblers through the molten mass of glass sweeping small bubbles or "seeds" and other small impurities along in their path.

In most applications, the bubbler nozzles are fed the gaseous medium at a pressure and for a time interval sufficient to form a bubble of desired size in the molten glass. This "pulse" of gas may be injected at some desired frequency which, in the past, has been controlled by valving actuated by timing devices and solenoids such as shown in U.S. Pat. No. 2,890,548 to J. W. Wright.

One additional aspect of the use of submerged bubblers is the churning effect on the glass in the tank and the attendant effect on thermal gradients in the tank.

It has been found, however, that where bubblers are to be used to improve glass purity and/or homogeneity, a random pattern of bubbles is not satisfactory in and of itself. When a plurality of nozzles are in close proximity to each other, and the gaseous medium is pulsed to each nozzle at some frequency, there is a likelihood that adjacent nozzles will be emitting bubbles at approximately the same time. It has been shown that the resultant simultaneous adjacent bubble formation can actually create small seeds in the tank as a consequence of turbulence from adjacent bubbles rising from the nozzles. Because of this problem, it is desirable to pulse the various bubbler nozzles in a sequential manner to prevent formation of additional seeds due to simultaneous emission of bubbles from closely adjacent bubbler nozzles.

Bubbler control systems have traditionally employed combinations of mechanical and electrical devices to time the pulses of gas through a system and operate the valving which controls distribution of the gaseous medium. Because of the environment to which such systems are generally exposed in glass production facilities, there is a continuing maintenance and reliability problem with electrical and mechanical devices employed in any such system. It is therefore desirable to avoid the use of such devices in a bubbler system employed in conjunction with a glass melting furnace.

It is also desirable to employ a gaseous medium of a type which tends to be more readily absorbed into the glass and thereby further obviate the tendency of seed formation resulting from turbulent bubbling action.

SUMMARY OF THE INVENTION

A process and apparatus for delivery of a gaseous medium to a series of bubbler nozzles in a glass tank wherein the gaseous medium serves both as the bubbling medium and as the medium used to control the operation of the system. During the period of time that a particular bubbler is not emitting bubbles, the gaseous medium within such nozzle is maintained at a relatively low pressure coordinated to offset the fluidic head pressure of the molten glass above the bubbler nozzle. Conversely, during the period of time that a particular bubbler is desired to emit bubbles, a gaseous medium at a higher relative pressure activates and controls an automatic system to direct the gas to the various nozzles in a particular sequence for predetermined periods of time.

DESCRIPTION OF THE PREFERRED EMBODIMENTS

Figure 1:
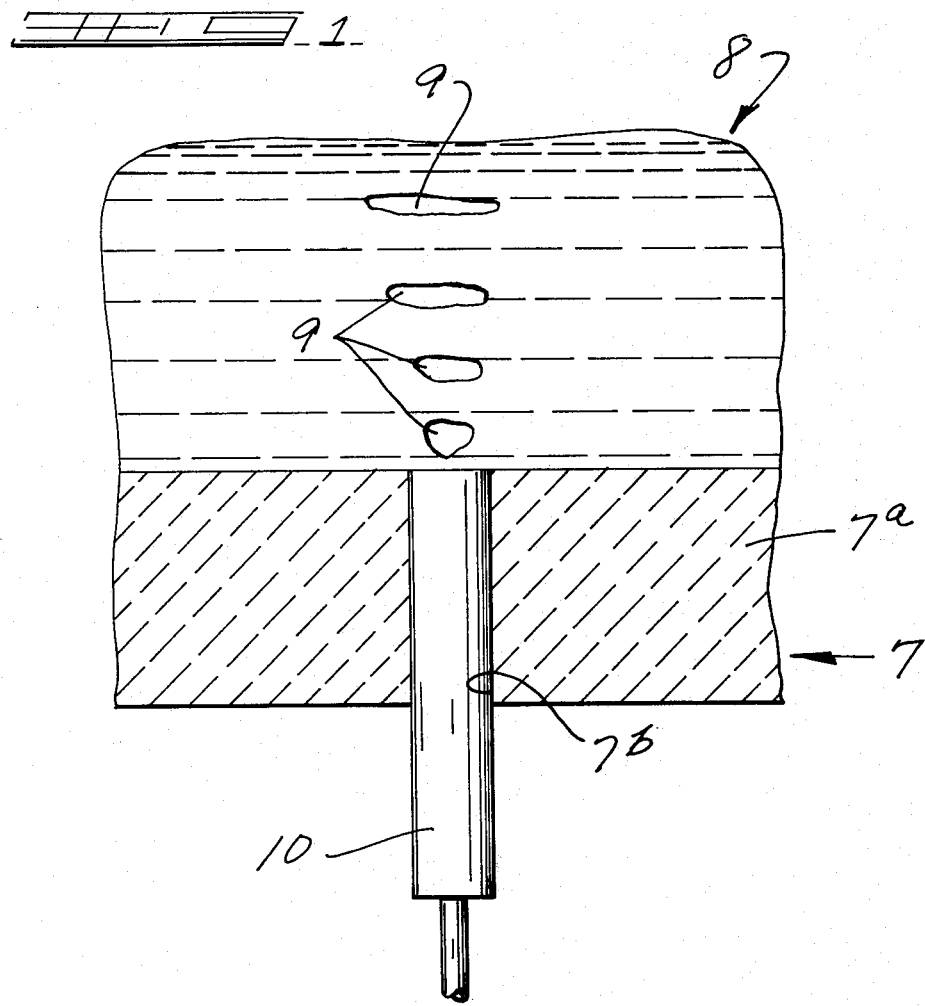
FIG. 1 is a fragmentary section of an elevational view illustrating bubbler means arranged to conduct a gaseous or gas forming medium through the floor of a glass melting furnace into the molten glass.

Referring first to FIG. 1 of the drawings, there is schematically shown a portion of a conventional glass furnace melting, or conditioning chamber 7 or the like, in which there is contained a body of molten glass 8. Extending vertically through the floor 7a of the chamber, which is preferably constructed from a suitable high temperature refractory material, there is an opening 7b in which there is situated a plurality of bubbler units, one of which is represented in FIG. 1 by the reference number 10, in contact with the molten glass 8. The bubbler unit 10 is operative to transfer a gaseous or gas forming medium from a suitable source of supply into the lower regions of the molten glass 8 and preferably in the vicinity of the furnace floor 7a. In this respect, the operation of the bubbler unit is standard and emits the gaseous or gas forming medium into the stream of molten glass in the form of gaseous bubbles 9 which gradually expand in size, as illustrated, under the effect of the elevated temperatures of the furnace and molten glass. The expanding bubbles rise toward the surface of the molten glass and produce currents in the glass together with an internal stirring and agitation thereof. Upon reaching the upper surface of the molten glass the greatly expanded gas bubbles burst and are discharged from the furnace together with the furnace stack gases, other gases of combustion, etc., or, if desired, are recovered by suitable recovery processess for further utilization.

Figure 2:
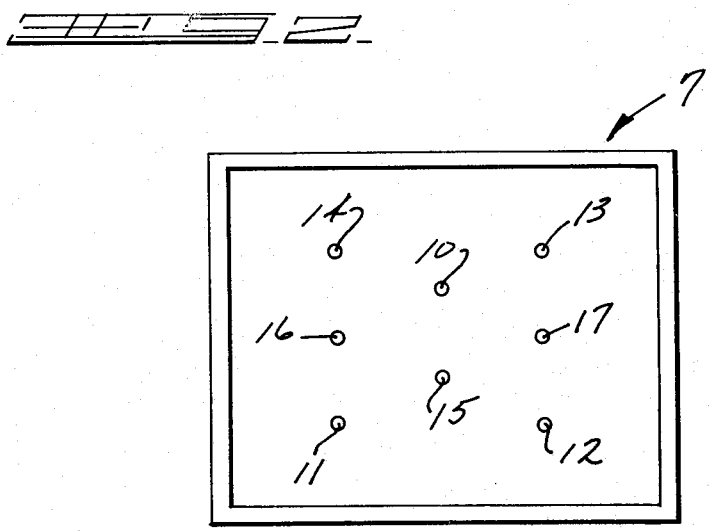
FIG. 2 is an enlarged fragmentary view of the discharge end of the bubbler means shown in FIG. 1.

As illustrated in FIG. 2, several bubbler units, such as bubbler units 10–17 inclusive are shown oriented in spaced grid-like array. Obviously, the pattern illustrated in FIG. 2 is merely exemplary of a great many positions, patterns and arrangements which are obtainable.

Figure 3:
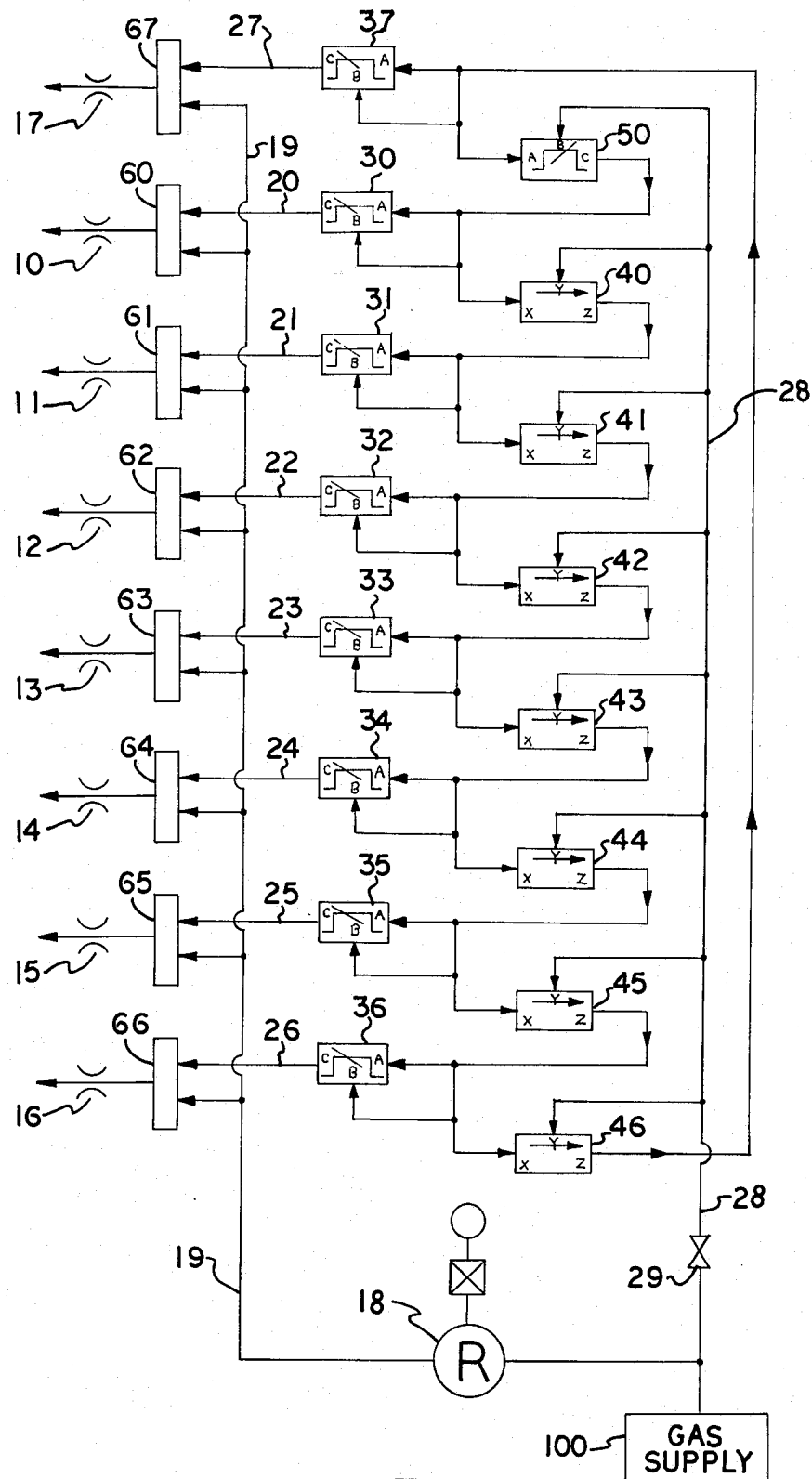
FIG. 3 is a view, schematically depicting a preferred embodiment of this invention and showing the means for delivering a gaseous media to the bubblers depicted in FIGS. 1 and 2 and for controlling such delivery, in accordance with a preferred embodiment of this invention.

In accordance with the present invention, the apparatus is adapted to automatically deliver a gaseous medium from a suitable source of supply to a plurality of bubbler nozzles which are schematically represented in FIGS. 2 and 3 by the reference numbers 10 through 17. It should be understood that this system may be easily adapted for any number of bubbler nozzle arrangements with more than one nozzle. These nozzles may be of any design common to the art and are arranged to emit a gaseous medium at a location submerged beneath the molten glass level of a glass melting furnace. The reference numbers which have been assigned to the various bubbler nozzles 10 through 17 coincide with the operational sequence order of bubbling during the cycle which will be subsequently described in greater detail. It is to be understood the nozzles 10 through 17 may be arranged in the glass furnace to result in whatever operational sequence of bubble formation, as well as operational placement, may be desirable in the furnace.

As can be seen in FIG. 3, a gas supply 100 is provided which is regulated by a pressure regulating means 18 which controls the gas and creates a source of gas at a first pressure which is carried in a first gas carrying means 19 to each of the nozzles 10 through 17. This first pressure is maintained by the pressure regulating means 18 at a magnitude sufficient to counterbalance the head pressure of the molten glass and thereby prevent the molten glass from entering the bubbler nozzles and causing damage thereto. The magnitude of this first pressure must be determined in each application and depends on such factors as depth of the glass above the nozzle, temperature and viscosity of the glass, and shape and size of the nozzle to be used. The gas pressure in the first gas carrying means 19 does not change during the operation of the apparatus.

Each of the nozzles 10 through 17 has a coresponding high pressure gas carrying means shown as 20 through 27 respectively. This plurality of high pressure gas carrying means 20 through 27 is used to carry the gas at high pressure to each of the respective nozzles 10 through 17 from other portions of the apparatus, as will be described later. Each of the nozzles 10 through 17 is connected to the respective high pressure gas carrying means 20 through 27 and also to the first gas carrying means 19 by means suitably adapted to prevent flow of the high pressure gas into the low pressure source of gas to direct the gas into the nozzles 10 through 17 at all times.

In FIG. 3, these means are shown as 60 through 67 for the respective bubbler nozzles 10 through 17. In the preferred embodiment, this is accomplished by use of a pneumatic logic element to perform an "or" function, such as a model 59010 element sold by Aro Corporation. The gas at the first pressure is not dissipated into the respective high pressure gas carrying means 20–27, but is directed through the respective nozzle 10 through 17, during those intervals when only the first gas carrying means 19 is in operation. Likewise, when one of the respective high pressure gas carrying means 20 through 27 is activated, the gas is directed into the particular nozzle or nozzles so activated, but not into the first gas carrying means 19.

Persons skilled in the art will recognize suitable alternatives and embodiments to perform this function in essentially the same manner.

The gas supply 100 is at a second pressure, which is a greater pressure than the gas pressure of the gaseous medium supplied by the first gas carrying means 19 which is under the control of pressure regulating means 18. This gas supply 100 is connected to a high gas pressure conduit means 28 which has a shut-off valve 29 which must be opened to permit gas to flow to the apparatus.

Connected to each of the respective high pressure gas carrying means 20 through 27 is one of a plurality of timed gas shut-off means shown as 30 through 37. These shut-off means 30 through 37 may take the form of normally open, pressure-actuated variable time delay valve means. In the preferred embodiment shown, these devices may be of the type of pneumatic logic element adapted to perform a "timing out" function such as a model 59120 element sold by Aro Corporation. These shut-off means or normally open valve means 30 through 37 each have two input ports designated as A and B and an output port shown as C. Each of the valve means 30 through 37 is normally open for passage of gas from port B through port C, and gas may flow into either input port A or B and be discharged through the outlet port C without initiating the timing-out function. The "timing out" function only commences when gas pressure is applied to input port A. When that occurs, there is flow from port B through the valve means for a predetermined length of time followed by a shutting-off of the flow. When pressure is released to the input port A, the valve automatically resets to the normally-open mode.

The length of time to be used and set on each of the various respective valve means 30 through 37 is, of course, determined by the length of time desired for the gas to be directed to the respective bubbler nozzles 10 through 17 by way of the high pressure gas carrying means 20 through 27. Such length of time, of course, ordinarily depends upon the various conditions of the molten glass contained in the glass melting furnace, as well as upon the size of the bubble desired to be emitted and the particular design of the bubbler nozzle.

It will be appreciated that, while each of the valve means 30 through 37 is depicted as having dual input ports A and B, a suitable single input port device could also be employed, where available, and require only minor changes in the schematic arrangement shown in FIG. 3.

That portion of the apparatus which is actuated by the gaseous medium and automatically directs the gaseous medium in a predetermined sequence to each of the valve means 30 through 37, and, hence, to the respective bubbler nozzles 10 through 17 by way of the high pressure gas carrying means 20 through 27 will now be described.

A plurality of dual port input, single port outlet, normally-closed, pressure-actuated, variable, time-delay valve means are depicted by the reference characters 40 through 46. These valve means 40 through 46 may be of the type similar to model 59121 logic element sold by Aro Corporation. Each of the valve means 40 through 46 has two input ports indicated in FIG. 3 at X and Y and a single outlet port indicated at Z. In manner of operation, the concurrent application of gas pressure to both inlet ports X and Y, followed by a variable, controllable time delay, causes each of the valve means 40 through 46 to shift to the open mode and thereby allow the passage of gas therethrough until such time as one or both of the inlet ports X and Y are depressurized to permit the valve to automatically resume a normally closed mode. The Y input ports of the normally closed valve means 40 through 46 are connected to the high gas pressure conduit means 28, which, in turn, is connected to one of two input ports of a dual port input, single port outlet normally open pressure-actuated variable time-delay valve means 50.

As represented in FIG. 3, input port B of valve means 50 functions as the input port connected to the high gas pressure conduit means 28. The dual input, normally open valve means 50 may be of the same type as that used for the shut-off means 30 through 37, since the action of either is the same, although the timing may be different. The output port C of valve means 50 is connected to the input ports A and B of the particular shut-off means 30 through 37 which is, in turn, connected to the first bubbler nozzle in the sequence of operation of the various nozzles 10 through 17. In FIG. 3, this is shown as shut-off means 30 connected to nozzle 10 by the high gas pressure carrying means 20. Additionally, output port C of valve means 50 is also connected to input port X of the normally closed valve means 40.

As further shown, each of the normally closed valve means 40 through 46 has connections between the output port Z and the respective input ports A and B of the particular shut-off means 31 through 37, the particular individual connections, of course, being arranged according to the desired sequence of bubbler operation. Likewise, each output port Z corresponding to each of the normally closed valve means 41 through 45 is connected to the appropriate input port X of the next normally closed valve means 42 through 46 in the circuit.

The last normally closed valve means 46 in the sequence has a connection from the Z output port to the appropriate input ports A and B of the shut-off valve means 37 for the last bubbler nozzle 17 in the sequence of operation, and is also connected to the input port A of the dual input normally open valve means 50.

It is understood that the number of bubbler nozzles may be varied and that appropriate changes in the circuitry would be required. Also, the arrangement depicted in FIG. 3 showing the sequence of bubbling following from one bubbler nozzle to the next adjacent nozzle is merely for descriptive purposes and for clarity in understanding the operational features of the invention.

OPERATION OF THE PREFERRED EMBODIMENT

It should be understood that the system operation involves three stages. First, the regulator 18 is adjusted so that enough pressure is fed to each bubbler nozzle 10 through 17 to prevent flow of molten glass into the nozzles. The extent of such pressure is dependent, of course, on many factors, but is typically five p.s.i. or less. The gas is carried through the first gas carrying means 19 for this purpose.

To start the controllable gas delivery system, the valve 29 is opened to allow high pressure gas into the high gas pressure conduit means 28.

Initially, the normally closed valve means 40 through 46 are in the closed mode with gas pressure being applied only to the Y input port. As mentioned, the timing in of these normally closed valve means 40 through 46 is only initiated after both input ports are pressurized.

The dual input, normally open valve means 50 is initially in the open mode. Since the timing-out function of this element is only initiated after both input ports A and B are pressurized, the gas from the conduit means 28 passes through and out the output port C.

The second stage of operation, therefore, involves the distribution of gas to each nozzle in a particular sequence and for predetermined lengths of time. The gas passes through the dual input normally closed valve means 40. This initiates the timing-in function, which means that after a time delay which is adjustable, the valve means 40 will move to the open mode, allowing gas to pass therethrough and exit through output port Z.

Simultaneously, the gas from the output port C of the dual input normally open valve means 50 pressurizes the input ports A and B of the shut-off means 30. Since this is a normally open valve, gas is allowed to pass on to the flow direction means 60 and on into the bubbler nozzle 10.

The timing-out function of the shut-off means 30 commences at the time both input ports are pressurized. After a controllable and adjustable time delay, the means 30 interrupts or shuts off the flow of gas to the bubbler nozzle.

As soon as the normally closed valve means 40 timing function is completed, it opens and allows gas to flow to the next set of shut-off means and normally closed valve means. Thus, the gas is directed to individual nozzles in the sequence desired.

It should be noted that the system remains pressurized, since the shut-off means 30 through 37 will remain closed so long as pressure is held on both input ports, and the normally closed elements 40 through 46 will remain open as long as both input ports are pressurized.

The third stage of the operation is the resetting of the elements in the system, so that another cycle can take place. When the last normally closed valve means 46 opens and gas passes to the shut-off means 37 and thereby on to the last bubbler nozzle 17 in the sequence, the second input port of the dual input normally open valve means 50 is also pressurized which starts the timing-out function of that element.

After the last nozzle 17 has completed bubbling, the valve means 50 closes. When that occurs, the pressure is cut off in the connecting lines and the shut-off means 30 switches back to the open mode and is ready for the next cycle. Similarly, the normally closed element 40 switches back to the closed mode, ready for the next cycle. This process then occurs in each pair of normally open and normally closed elements down through the system.

When the last normally closed element 46 closes, the pressure is released to the A input port of the valve means 50, which then reopens, allowing the cycle to start over again.

The delay settings on the various times may, of course, be altered considerably within the limits of the equipment used. Generally, of course, each bubbler is set the same, but this system does not impose that restriction. The closing of the dual input normally open valve means 50 is best delayed until after the last shut-off means 37 has timed out. This is not a strict requirement, but the timing for that bubbler nozzle 17 is more precise.

I claim:

1. In apparatus for delivering a gaseous medium to a plurality of bubbler nozzles in a glass melting furnace wherein a first pressure source of said gaseous medium is connected to a first gas carrying means to conduct the flow of said gaseous medium to said nozzles and wherein a pressure regulating means is provided to balance said first pressure with the pressure head of glass over said nozzles in said glass furnace, the improvement comprising a supply of said gaseous medium at a second pressure greater than said first pressure, and an automatically controllable gas delivery system actuated by said supply of gas to direct volumes of said gaseous medium at said second pressure to each of said plurality of bubbler nozzles in a predetermined sequence and for predetermined lengths of time.

2. The improvement of claim 1 wherein said automatically controllable gas delivery system actuated by said supply of gas includes:

a plurality of fluid OR gates, one for each of said bubbler nozzles, having an output port connected to said bubbler nozzles and one input port connected to said first pressure source and a second input port connected to said second pressure supply through a timed sequence control means actuated by said second pressure supply.

3. The improvement of claim 2 wherein said timed sequence control means includes:

a plurality of normally open, gas operated logic elements, one for each of said bubblers, having an output port connected to said second input port of said OR gates and two input ports, each being connected to an output port of a sequencing means, said gas operated logic elements including a timing function which closes said normally open logic element a pre-selected length of time after both input ports are furnished with a gas under pressure.

4. The improvement of claim 3 wherein said sequencing means comprises:

a single normally open, gas operated logic element having an output port connected to both input ports of the first one of said plurality of normally open, gas operated logic elements and two input ports, one of said input ports being connected to said second pressure supply, said single normally open, gas operated logic element including a timing function which closes said normally open logic element a preselected length of time after both input ports are furnished with a gas under pressure; and a plurality, one less than said plurality of said normally open, gas operated logic elements, of normally closed, gas operated logic elements, said plurality of normally closed elements having an output port and two input ports, said normally closed logic element opening when both input ports are furnished with a gas under pressure, the output port of the first one of said plurality of normally closed logic elements being connected to both input ports of the second one of said plurality of normally open logic elements and to one input port of the next one in sequence of said plurality of normally closed logic elements, the output ports of the remainder of said plurality of normally closed logic elements being respectively connected to both input ports of respective ones of said plurality of normally open logic elements and to one input port of the next one in sequence of said plurality of normally closed logic elements, the last one of said plurality of normally closed logic elements having its output port connected to a second input port of said single normally open logic element and to both input ports of the last one in sequence of said plurality of normally open logic elements, the second input port of all of said plurality of normally closed logic elements being connected to said second pressure supply, said plurality of normally closed logic elements including a timing function which delays opening of said normally closed logic element a pre-selected length of time after both input ports thereof are furnished with a gas under pressure.

5. In apparatus for delivering a gaseous medium to a plurality of bubbler nozzles in a glass furnace, wherein a first pressure source of said gaseous medium is connected to a first gas carrying means to conduct the flow of said gaseous medium to said nozzles and wherein a pressure regulating means is provided to balance said first pressure with the pressure head of glass over said nozzle in said glass furnace, an automatic, controllable gas delivery system actuated by said gaseous medium to direct volumes of said gaseous medium at a second pressure greater than said first pressure to each of said plurality of bubbler nozzles in a predetermined sequence and for predetermined lengths of time, comprising:

a second pressure source of said gaseous medium in excess of the pressure of said first pressure source, a plurality of high pressure gas carrying means connected to each of said bubbler nozzles, means connecting said first gas carrying means and said plurality of high pressure gas carrying means to each of said nozzles adapted to prevent flow of said gaseous medium from said first gas carrying means into said high pressure gas carrying means during intervals when said high pressure gaseous medium is not being directed to said nozzles, and to prevent flow of high pressure gaseous medium into said first gas carrying means, high gas pressure conduit means connecting said second pressure source and a first port of a dual port input, single port outlet normally open pressure actuated variable time delay valve means adapted to interrupt flow of said high pressure gaseous medium therethrough after both input ports of said dual input normally open valve means have had high pressure gaseous medium introduced thereto for a predetermined length of time, said dual input normally open valve means adapted to automatically reset open upon removal of gas pressure to at least one of said input ports, said output port of said dual input normally open valve means connected to the input port of the first of a plurality of normally open, pressure actuated variable time delay valve means, each output port of said normally open valve means connected to one of said bubbler nozzles by one of said plurality of high pressure gas carrying means, said normally open valve means adapted to interrupt the flow of said gaseous medium to the respective bubbler nozzle after passage of said gaseous medium through said normally open valve means for a predetermined length of time, said normally open valve means adapted to automatically reset open upon release of gas pressure into said normally open valve means, said output port of said dual input normally open valve means also connected to a first input port of a first of a plurality of dual port input, single port outlet normally closed pressure actuated variable time delay valve means adapted to allow passage of said gaseous medium therethrough after both input ports of said normally closed valve means have had high pressure gaseous medium applied thereto for a predetermined length of time, said normally closed valve means adapted to automatically reset closed upon release of gas pressure to at least one of said input ports, each of said normally closed valve means having one of said input ports connected to said high gas pressure conduit means, each of the remaining said plurality of normally open valve means connected to the outlet port of the respective normally closed valve means preceding each of said normally open valve means in the predetermined bubbler sequence, said outlet port of each of said normally closed valve means connected to the second said input port of said respective normally closed valve means adapted to be next in the predetermined bubbler sequence, with the last of said normally closed valve means in said sequence connected to the second input port of said dual input normally open valve means to provide for automatic resetting of said normally closed valve means and cycling of said bubblers in said predetermined sequence.

* * * * *